T. J. MOORE.
HANDHOLD OR LIFT FOR TRUNK TRAYS AND THE LIKE.
APPLICATION FILED DEC. 21, 1909.

953,485.

Patented Mar. 29, 1910.
2 SHEETS—SHEET 1.

WITNESSES:
Fred'k W. Fraentzel
Anna H. Alter

INVENTOR:
Thomas J. Moore,
BY
Fraentzel and Richards,
ATTORNEYS

T. J. MOORE.
HANDHOLD OR LIFT FOR TRUNK TRAYS AND THE LIKE.
APPLICATION FILED DEC. 21, 1909.

953,485.

Patented Mar. 29, 1910.

2 SHEETS—SHEET 2.

WITNESSES:
Fred'k H. W. Fraentzel
Anna H. Alter.

INVENTOR:
Thomas J. Moore,
BY Fraentzel and Richards,
ATTORNEYS.

UNITED STATES PATENT OFFICE.

THOMAS J. MOORE, OF BROOKLYN, NEW YORK, ASSIGNOR TO THE R. NEUMANN HARDWARE CO., A CORPORATION OF NEW JERSEY.

HANDHOLD OR LIFT FOR TRUNK-TRAYS AND THE LIKE.

953,485.   Specification of Letters Patent.   Patented Mar. 29, 1910.

Application filed December 21, 1909. Serial No. 534,292.

*To all whom it may concern:*

Be it known that I, THOMAS J. MOORE, a citizen of the United States, residing at Brooklyn, in the county of Kings and State of New York, have invented certain new and useful Improvements in Handholds or Lifts for Trunks-Trays and the Like; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in grips or handholds for use with trunk-trays, boxes, desk-slides, and many other similar devices.

This invention has for its principal object to provide a novel, simple, neat, cheap and easily constructed and applied grip or handhold for the purpose above set forth, the same being so constructed as to present a pleasing appearance, and at the same time providing a very effective means for handling, lifting and carrying the trunk-tray, or other device, to which said hand-holds or grips may be attached.

The invention has for its further object to provide a sheet-metal hand-hold or lift for the trays of trunks, and the like, in lieu of the usual fabric lifts at present employed, to provide a hand-hold or lift which can not become displaced, and one which can be more easily taken hold of without any danger of cutting the fingers.

This invention consists, primarily, in the novel grip or hand-hold hereinafter fully set forth; and, the invention consists, furthermore, in the novel arrangements and combinations of the various parts, as well as in the details of the construction thereof, all of which will be hereinafter fully described and then finally embodied in the clauses of the claims which form a part of this specification.

The invention is clearly illustrated in the accompanying drawings, in which:—

Figure 1:
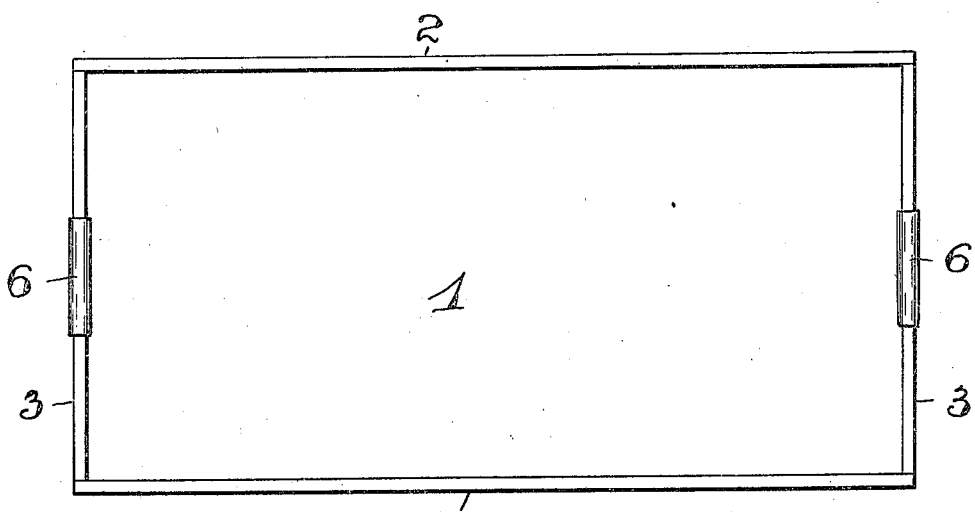
Figure 2:
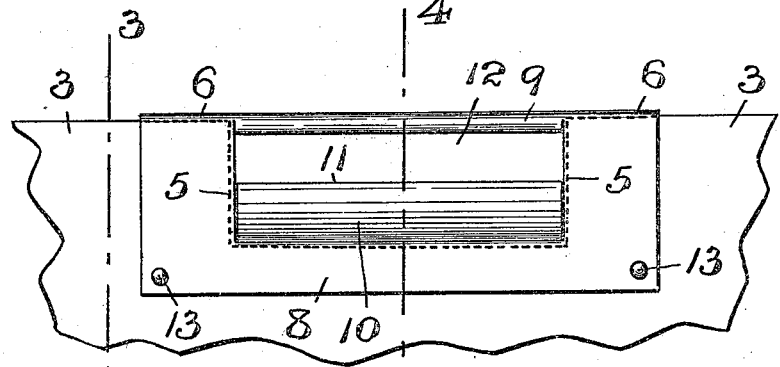
Figure 3:
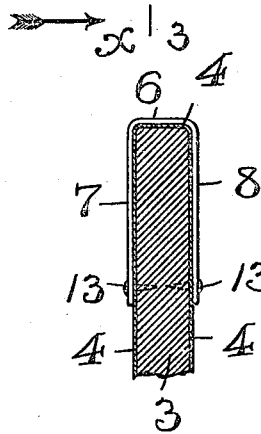
Figure 4:
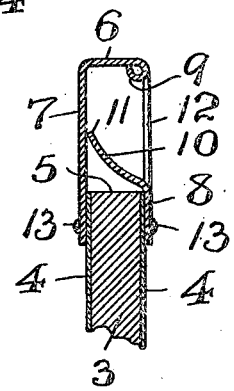
Figure 6:
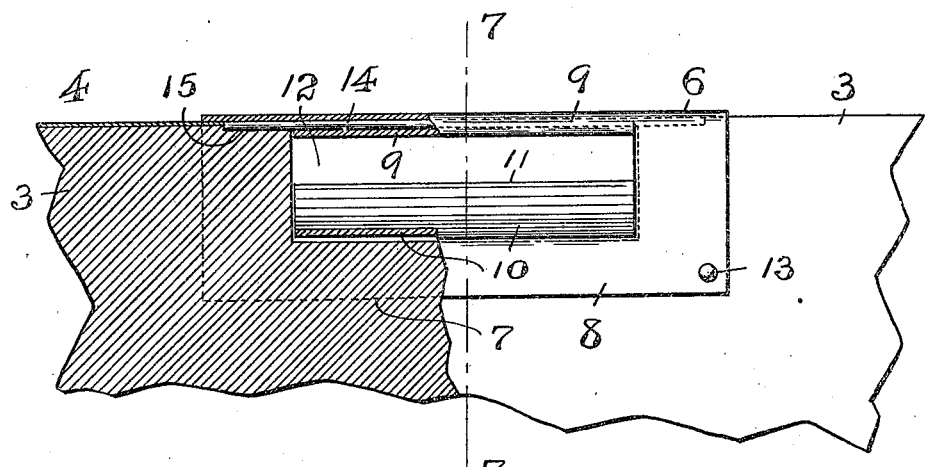
Figure 5:
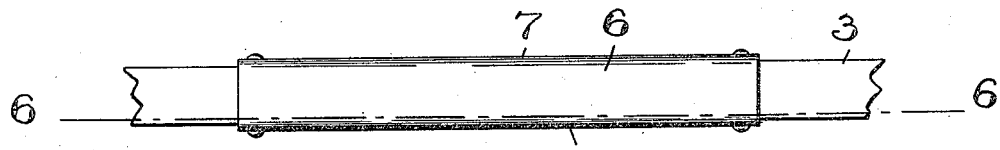
Figure 7:
Figure 7:
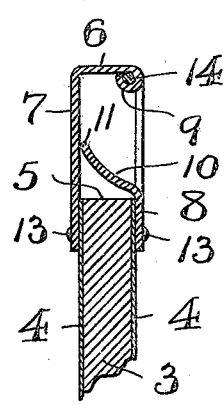

Figure 1 is a plan view of a trunk-tray, the same being provided with grips or handholds, made according to and showing one embodiment of the principles of the present invention. Fig. 2 is a detail view of a portion of the interior face of an end-wall of a trunk-tray, showing in elevation my novel form of grip or hand-hold in its operatively secured relation to said portion of the tray. Fig. 3 is a transverse section, taken on line 3—3 in said Fig. 2, looking in the direction of the arrow $x$; and Fig. 4 is another transverse section taken on line 4—4 in said Fig. 2. Fig. 5 is a top-edge view of a grip or handhold and a portion of the trunk-tray, said view being made on an enlarged scale; Fig. 6 is a part side elevation and part longitudinal vertical section of the said grip or handhold, said section being taken on line 6—6 in said Fig. 5, looking in the direction of the arrow $y$, and said view showing in connection therewith a strengthening or reinforcing means for preventing the tearing or breaking of the sheet-metal grip or hand-hold, when used with large and heavy trays; and Fig. 7 is a transverse vertical section taken on line 7—7 in said Fig. 6.

Similar characters of reference are employed in all of the above described views, to indicate corresponding parts.

Referring now to the said drawings, the reference-character 1 indicates a trunk-tray, the same being provided with the usual side-walls 2 and end-walls 3. The said trunk-tray may be provided with the usual lining 4, of any desirable material such as linen, paper, or the like, and the said end-walls 3 are each provided with a cut-out portion 5. The said grip or hand-hold comprises a suitable body-portion 6 which may have any suitable marginal configuration, being provided with a downwardly extending outer face-member 7 and a downwardly extending inner face-member 8, both of which preferably form an integral part of said body-portion 6, and are bent down so as to depend from opposite sides or edges of the said body-portion 6. The said body-portion 6 is arranged upon the end wall 3 of the said trunk-tray 1, so that the face-members 7 and 8 will straddle said end wall 3 in such a manner, so as to cover the said cut-out portion 5. The inner face-member 8 is further provided with a cutaway portion which is arranged so as to form a tongue which is bent or curled to provide a rim or bead 9, whereby a perfect hand-hold and one which will not cut into the fingers, is provided. In like manner, the said inner face-member 8 is further provided with a cutaway portion arranged so as to be bent or pressed inwardly within the cut-out portion 5 of said end-wall 3, to provide an inwardly projecting tongue 10, the free marginal edge-portion 11 of which engages the interior side of the opposite outer face-member 7. The said tongue 10 forms a suitable guide for the fingers, when they are placed in the opening 12, formed by the bent cutaway portion above described, and tends to direct the fingers into engagement with the under side of said body-portion 6, the said rim or bead 9 forming a means adapted to prevent the fingers from slipping away from a lifting contact with said body-portion 6. The said grip or hand-hold thus formed may be secured in its operative position upon the tray or the like by means of nails, tacks, or rivets 13, which are driven through the lower corners of said inner and outer face-members 7 and 8 and into the body of said end-wall 3.

In order to prevent the tearing out or breaking away of the curled rim or bead 9 at the joints where it is connected with the upper face of the body-portion 6, when used with large and heavily loaded trunk-trays, a strengthening or reinforcing means, preferably in the form of a rod or wire, as 14, is arranged within said curled rim or bead 9, said rod or wire having its end-portions projecting beyond the ends of the said curled rim or bead, and rigidly mounted between the upper edge-portions of the tray and the lower surface-portions of the body 6 of the grip or hand-hold, substantially in the manner illustrated in Figs. 5 and 6 of the drawings.

When the rod or wire 14 is quite heavy, the portions of the trunk-tray can be grooved or gouged out, as at 15, so as to provide receiving recesses or pockets in which the end-portions of the rod or wire may be placed, as will be clearly understood.

From the above description it will be seen, that I have devised a simple, neat, and effective construction of grip or hand-hold adapted to be used in connection with trunk trays and other devices, the same having no projecting edges or portions to catch or tear articles of clothing placed in the trunk-tray 1, or cut or injure the fingers when making use of the same; and, the said grip or hand-hold is further constructed so as to be practically flush with both faces of the end-wall 3, thus presenting a neat, ornamental and very sightly appearance, as well as economizing space.

I am aware that some changes may be made in the various arrangements and combinations of the several parts without departing from the scope of my present invention, as set forth in the foregoing specification, and as defined in the claims which are appended thereto. Hence, I do not limit my invention to the exact arrangements and combinations of the various parts as herein described and as illustrated in the accompanying drawings, nor do I confine myself to the exact details of the construction of said parts.

I claim:

1. A grip or hand-hold for trunk-trays, or the like, comprising a body-portion adapted to register with the top edge of the end-wall of said trunk-tray, or the like, and above a cut-out portion in said end wall, inner and outer face-members integrally formed with said body-portion and depending therefrom so as to cover said cut-out portion in said end-wall, said inner face-member being provided with cut-away and bent portions adapted to form an opening therein through which the fingers may be inserted.

2. A grip or hand-hold for trunk-trays, or the like, comprising a body-portion adapted to register with the top edge of the end-wall of said trunk-tray, or the like, and above a cut-out portion in said end-wall, inner and outer face-members integrally formed with said body-portion and depending therefrom so as to cover said cutout portion in said end-wall, said inner face-member being provided with a cut-away portion, the same being bent to form a rim or bead beneath the inner edge of said body-portion, said inner face-member being further provided with a second cut-away portion, the same being bent to form an inwardly projecting tongue, said cut-away portions respectively bounding the upper and lower edges of an opening through which the fingers may be inserted to engage said body-portion, substantially as and for the purposes set forth.

3. A grip or hand-hold for trunk-trays, or the like, comprising a body-portion, depending face-members extending from the longitudinal edges of said body-portion, one of said face-members being provided with an opening, the upper edge of said face-member directly above said opening being bent in the form of a rim or bead, and the lower edge portion of said face member being bent in the form of an inwardly projecting guiding tongue extending into said opening, substantially as and for the purposes set forth.

4. A grip or hand-hold for trunk-trays, or the like, comprising a body-portion, depending face-members extending from the longitudinal edges of said body-portion, one of said face-members being provided with an opening, the upper edge of said face-member directly above said opening being bent in the form of a rim or bead, and the lower edge portion of said face member being bent in the form of an inwardly projecting guiding tongue extending into said opening, and a reinforcing wire within said bead, substantially as and for the purposes set forth.

5. The combination with a tray having a cut-out portion, of a grip or hand-hold comprising a main body, and downwardly depending flanges, one of said flanges having an opening for the insertion of the fingers therein, and an inwardly extending and curved guiding means in said opening and connected with said flange.

6. The combination with a tray having a cut-out portion, of a grip or hand-hold comprising a main body and downwardly depending flanges, one of said flanges having an opening for the insertion of the fingers therein, and an inwardly extending and curved guiding means in said opening and connected with said flange, a bead connected with said body and located in the upper part of said opening, and a reinforcing wire within said bead, substantially as and for the purposes set forth.

In testimony, that I claim the invention set forth above I have hereunto set my hand this 16th day of December 1909.

THOMAS J. MOORE.

Witnesses:
 FREDK. C. FRAENTZEL,
 FREDK. H. W. FRAENTZEL.